(12) United States Patent
Hsia (10) Patent No.: US 10,660,179 B1
(45) Date of Patent: May 19, 2020

(54) SOLID-STATE LIGHTING WITH MULTIPLE CONTROLS AND TESTS

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/735,410

(22) Filed: Jan. 6, 2020

Related U.S. Application Data (63) Continuation-in-part of application No. 16/694,970, filed on Nov. 25, 2019, now Pat. No. 10,602,597, which is a continuation-in-part of application No. 16/681,740, filed on Nov. 12, 2019, which is a continuation-in-part of application No. 16/664,034, filed on Oct. 25, 2019, which is a continuation-in-part of application No. 16/572,040, filed on Sep. 16, 2019, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, (Continued)

(51) Int. Cl.
*H05B 45/37* (2020.01)
*H02J 7/00* (2006.01)
*H02J 9/06* (2006.01)
*H05B 45/14* (2020.01)

(52) U.S. Cl.
CPC .............. *H05B 45/37* (2020.01); *H02J 7/007* (2013.01); *H02J 9/065* (2013.01); *H05B 45/14* (2020.01)

(58) Field of Classification Search
CPC ........ H05B 45/00; H05B 45/10; H05B 45/14; H05B 45/37; H05B 47/00; H05B 47/10; H02J 7/007; H02J 9/065
See application file for complete search history.

(56) References Cited

U.S. PATENT DOCUMENTS

2015/0214785 A1* 7/2015 Jagjitpati ................ H02J 9/065
307/66

* cited by examiner

*Primary Examiner* — Jimmy T Vu
(74) *Attorney, Agent, or Firm* — Han IP PLLC; Andy M. Han (57) ABSTRACT

A light-emitting diode (LED) luminaire control gear comprising a rechargeable battery and a control and test circuit is adopted to provide an emergency power to operate a luminaire that works only in alternate-current (AC) mains. The luminaire comprises LED arrays and a power supply. The LED luminaire control gear further comprises a current-fed converter circuit, a control and test unit, and a relay switch. When a line voltage from the AC mains is unavailable or when a battery discharging test is initiated, the LED luminaire control gear is automatically started to provide a high DC voltage within an input operating voltage range of the luminaire and a low-voltage conversion circuit to control the power supply to operate the LED arrays without strobing. The relay switch is configured to couple either the line voltage or the high DC voltage to the power supply to operate thereon.

28 Claims, 4 Drawing Sheets

Related U.S. Application Data which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

SOLID-STATE LIGHTING WITH MULTIPLE CONTROLS AND TESTS

CROSS-REFERENCE TO RELATED APPLICATIONS

The present disclosure is part of a continuation-in-part (CIP) application of U.S. patent application Ser. No. 16/694,970, filed 25 Nov. 2019, which is part of CIP application of U.S. patent application Ser. No. 16/681,740, filed 12 Nov. 2019, which is part of CIP application of U.S. patent application Ser. No. 16/664,034, filed 25 Oct. 2019, which is part of CIP application of U.S. patent application Ser. No. 16/572,040, filed 16 Sep. 2019, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 10 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaire controls and more particularly to an LED luminaire control gear with multiple controls and tests, which can enable a regular luminaire to operate in both normal power and emergency power.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED luminaire control gear that can work with a regular LED lamp, an LED luminaire, or an LED lighting system with minimum retrofitting efforts, that can enable an emergency operation using a battery backup system, and that can support auto-testing to meet regulatory requirements.

SUMMARY

An LED luminaire control gear comprises a rechargeable battery with a terminal voltage, a control and test circuit, and a current-fed converter circuit configured to receive power from the rechargeable battery and to generate a high direct current (DC) voltage operating an external power supply unit, further powering up external one or more LED arrays when a line voltage from the AC mains is unavailable. The external power supply unit is originally configured to operate the external one or more LED arrays with a rated power by using the line voltage from the AC mains. By adopting the LED luminaire control gear with a low-voltage conversion circuit to adapt a dimming signal, the external power supply unit can operate the one or more LED arrays at a fraction of the rated power without strobing.

The external power supply unit comprises at least two electrical conductors, a main full-wave rectifier, and an input filter. The at least two electrical conductors are configured to couple to the LED luminaire control gear and to receive an input voltage. The main full-wave rectifier is coupled to the at least two electrical conductors and configured to convert the input voltage into a primary direct-current (DC) voltage. The input filter is configured to suppress electromagnetic interference (EMI) noises. The external power supply unit further comprises a power switching converter comprising a main transformer and a power factor correction (PFC) and power switching circuit. The PFC and power switching circuit is coupled to the main full-wave rectifier via the input filter and configured to improve a power factor and to convert the primary DC voltage into a main DC voltage. The main DC voltage is configured to directly couple to the one or more LED arrays to operate thereof. The main full-wave rectifier may be further configured to guide an input DC current flow and to operate the PFC and power switching circuit regardless of polarity of the high DC voltage associated with the input DC current.

The LED luminaire control gear further comprises at least one full-wave rectifier and a battery charging circuit. The at least one full-wave rectifier is coupled to the AC mains and configured to convert the line voltage from the AC mains into a first DC voltage. The battery charging circuit comprises a first transformer, a first control device, a first electronic switch, a first diode, a first ground reference, a second ground reference electrically isolated from the first ground reference, and a galvanic isolation circuit coupled to the first ground reference and the second ground reference. The battery charging circuit is configured to be coupled to the at least one full-wave rectifier to convert the first DC voltage into a second DC voltage that charges the rechargeable battery to reach the terminal voltage. The galvanic isolation circuit is configured to couple the second DC voltage to the first control device in response to various charging voltage and current requirements. The galvanic isolation circuit comprises a shunt regulator and an opto-isolator circuit comprising an LED and a photo-transistor optically coupled to the LED. The LED is configured to monitor the second DC voltage through the shunt regulator whereas the photo-transistor is configured to send a signal to the first control device to turn the first electronic switch on and off, thereby regulating the second DC voltage and a charging current.

The current-fed converter circuit comprises a rectifier, at least one capacitor, and an inductor comprising a tap. The tap is configured to divide the inductor into a first sub-inductor and a second sub-inductor. The first sub-inductor is configured to couple to the terminal voltage whereas the second sub-inductor is configured to magnetically couple to the first sub-inductor. The inductor is configured to generate energy pulses that have high voltage potential compatible to a voltage in an input operating voltage range of the external power supply unit. The rectifier is coupled to the second sub-inductor whereas the rectifier and the at least one capacitor are configured to convert the energy pulses into a third DC voltage (i.e. the high DC voltage mentioned above) when the current-fed converter circuit is enabled. The current-fed converter circuit further comprises a second control device and a second electronic switch whereas the second control device is configured to turn the second electronic switch on and off, thereby charging and discharging the inductor to generate the energy pulses and to regulate the third DC voltage at the at least one capacitor. The inductor comprises a first inductance whereas the first sub-inductor comprises a second inductance smaller than the first inductance. The first inductance and the second inductance form an inductance ratio between 10 and 25 to create the third DC voltage high enough to operate the external power supply unit. The inductance ratio depends on both the terminal voltage and the input operating voltage range of the external power supply unit.

The control and test circuit comprises a control and test unit and a charging detection and control circuit. The control and test circuit is configured to either enable or disable the current-fed converter circuit and to control either the line voltage from the AC mains or the third DC voltage from the current-fed converter circuit to the external power supply unit to operate according to availability of the AC mains and whether a battery discharging test is initiated.

The control and test circuit comprises a relay switch and is configured to enable or disable the current-fed converter circuit. The relay switch comprises a power sensing coil with a pick-up voltage and is configured to couple either the third DC voltage or the line voltage from the AC mains to the external power supply unit to operate thereon, subsequently powering up the external one or more LED arrays coupled with the external power supply unit. The relay switch further comprises a first input electrical terminal, a second input electrical terminal, and a pair of input electrical terminals. The first input electrical terminal is configured to couple to a hot wire of the line voltage from the AC mains whereas the second input electrical terminal is configured to couple to a high-potential lead wire of the third DC voltage. The pair of input electrical terminals are configured to receive the pick-up voltage to operate the power sensing coil. The relay switch further comprises an output electrical terminal configured to relay either the hot wire of the line voltage from the AC mains or the high-potential lead wire of the third DC voltage to the external power supply unit to operate thereon.

The control and test circuit may further comprise a low-voltage conversion circuit configured to regulate the external power supply unit to operate with a fraction of power consumed when the line voltage from the AC mains is available. The low-voltage conversion circuit is configured to tweak the dimming circuit in the external power supply unit and to maintain stability of the external power supply unit in a way that the external one or more LED arrays are operated with the fraction of power without strobing. The low-voltage conversion circuit comprises an electronic switch configured to pull down a dimming signal in the external power supply unit. The relay switch further comprises a single-pole double-throw (SPDT) configuration. The current-fed converter circuit further comprises a current return path configured for the third DC voltage to deliver power to the external power supply unit and to operate thereon.

The control and test circuit further comprises a user interface and a control and test unit. The control and test unit is configured to probe the second DC voltage, to receive input signals from the user interface, to control charging and discharging of the rechargeable battery, and to perform a battery discharging test. The control and test unit is further configured to receive a pull-down signal from the user interface and to send a first control signal to the first control device to inactivate the battery charging circuit when the battery discharging test is initiated. The user interface comprises a push-button switch configured to provide the input signals to the control and test unit. The input signals comprise various designated codes configured for the control and test unit to execute charging and discharging of the rechargeable battery and the battery discharging test. The user interface is further configured to manually have the control and test unit stop the battery discharging test, thereby terminating the third DC voltage appeared at the high-potential lead wire to prevent users from electric shock. The user interface may further comprise a remote control comprising a push-button switch configured to provide the input signals to the control and test unit. The control and test circuit further comprises a charging detection and control circuit. The charging detection and control circuit comprises a first transistor circuit configured to detect the second DC voltage. The charging detection and control circuit is coupled between the battery charging circuit and the rechargeable battery and controlled by the control and test unit. When the first transistor circuit detects the second DC voltage, a pull-down signal is sent to the control and test unit to enable a normal charging process, thereby allowing a charging current to flow into the rechargeable battery. The charging detection and control circuit further comprises a charging control circuit comprising a second transistor circuit and at least one metal-oxide-semiconductor field-effect transistor (MOSFET) circuit. The charging control circuit is configured to prohibit the charging current to flow into the rechargeable battery when the battery discharging test is initiated. The second transistor circuit is configured to receive a high-level signal equal to a nominal operating voltage of the control and test unit therefrom to pull down a bias voltage of the at least one MOSFET circuit, thereby disconnecting the charging current when the battery discharging test is initiated. The control and test circuit further comprises a voltage regulator coupled to the power sensing coil whereas the voltage regulator is configured to regulate the pickup voltage applied to the power sensing coil. When the current-fed converter circuit is enabled, the pick-up voltage is built up for the power sensing coil to operate.

The control and test unit comprises one or more timers. Each of the one or more timers respectively comprises multiple time delays. The multiple time delays of each of the one or more timers respectively comprise at least one initial time delay and a next time delay immediately following the at least one initial time delay. Upon an initiation of each of the one or more timers, the at least one initial time delay begins with the terminal voltage applied. At an end of the at least one initial time delay, an output of the control and test unit is activated to reach a logic high level and remains activated so as to enable the current-fed converter circuit for the next time delay. At an end of the next time delay, the output of the control and test unit is inactivated to drop to a logic low level. The at least one initial time delay and the next time delay form a primary sequence that repeats. A duration over the next time delay is configured to allow the control and test unit to perform the battery discharging test. The next time delay comprises a nominal duration of 90 minutes or 30 seconds. The at least one initial time delay comprises a nominal duration of 30 days or 365 days. The charging detection and control circuit further comprises a first peripheral circuit configured to sample a fraction of the terminal voltage on the rechargeable battery and to deliver to the control and test unit to examine over the duration of the next time delay when the battery discharging test is initiated. The control and test unit is configured to examine the terminal voltage on the rechargeable battery in reference to a nominal voltage in a range from 85% to 87.5% of a rated terminal voltage of the rechargeable battery. The charging detection and control circuit further comprises at least one status indicator coupled to the control and test unit and is configured to show results of the battery discharging test. The charging detection and control circuit further comprises at least one pair of electrical contacts configured to electrically couple the rechargeable battery to the battery charging circuit and the control and test unit. When the at least one pair of electrical contacts are connected, power from the rechargeable battery can operate the control and test unit when the battery discharging test is initiated or when the line voltage from the AC mains is unavailable. When disconnected, the at least one pair of electrical contacts can prevent the rechargeable battery from being drained. The at least one pair of electrical contacts comprise electrical contacts in a switch, a relay, and a jumper, or electrical terminals accommodated for jumper wires. The control and test unit comprises a microcontroller, a microchip, or a programmable logic controller.

The control and test unit comprises a microcontroller, a microchip, or a programmable logic controller. In this disclosure, the LED luminaire control gear may be adopted to couple to various LED luminaires such as high-power UFO lighting fixtures over 100 watts, sport lighting fixtures over 200 watts, low-power panel lights under 50 watts, LED lamps under 20 watts, etc. with the control and test unit to auto-test charging and discharging current of the rechargeable battery, supporting dual mode operations of such LED luminaires to work in a normal mode and in an emergency mode.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "main", a "primary", a "secondary", a "preliminary", an "initial", a "first", a "second", a "third", and so forth does not necessarily represent a part that is mentioned in an ordinal manner, but a particular one.

DETAILED DESCRIPTION OF THE INVENTION

Figure 1:
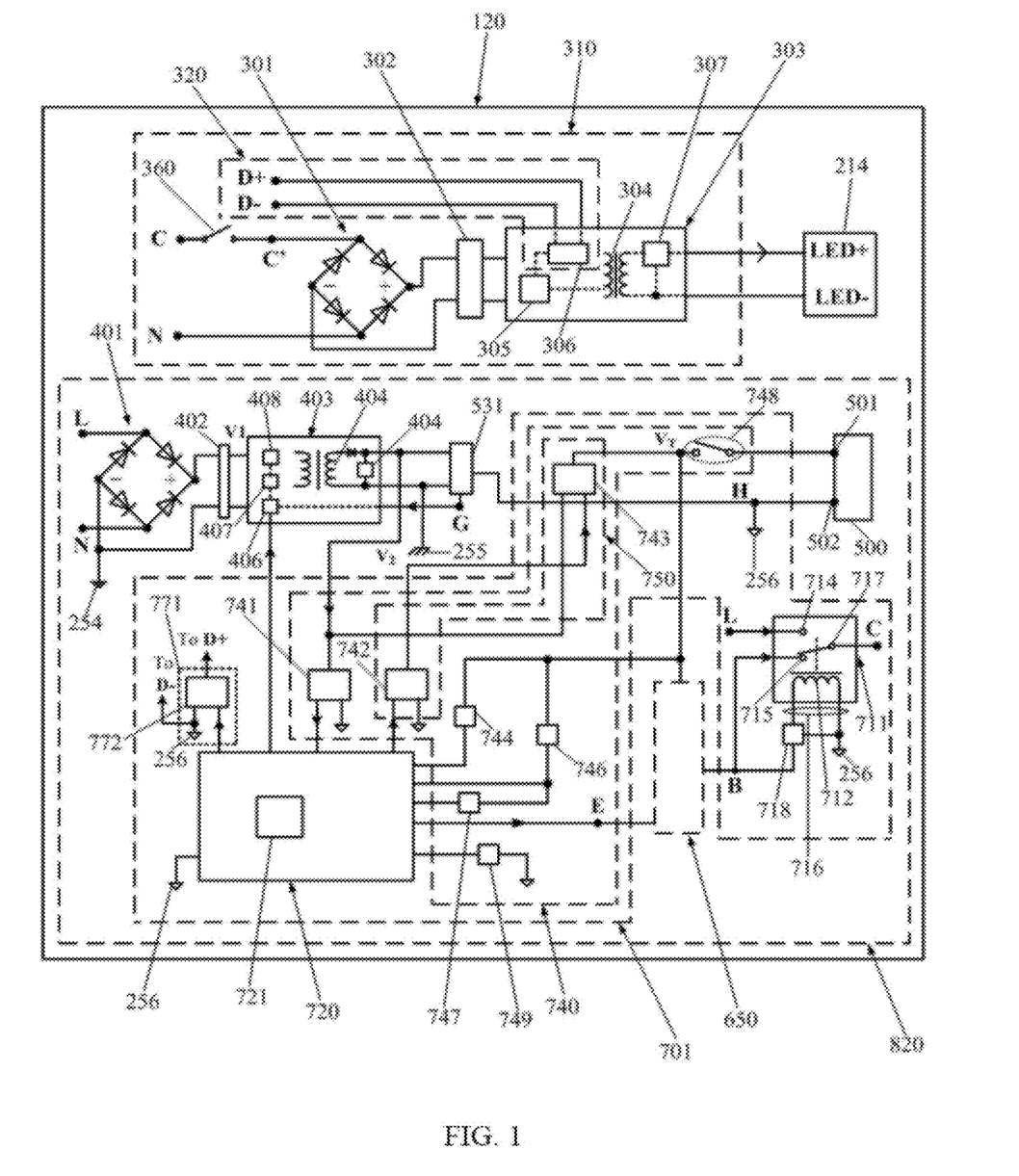
FIG. 1 is a block diagram of an LED luminaire control gear according to the present disclosure.

FIG. 1 is a block diagram of an LED luminaire control gear according to the present disclosure. An integrated LED luminaire 120 is used to replace various LED luminaires such as high-power UFO lighting fixtures over 100 watts, sport lighting fixtures over 200 watts, low-power panel lights under 50 watts, LED lamps under 20 watts, etc. to support dual mode operations of such LED luminaires to work not only in a normal mode but also in an emergency mode. In FIG. 1, the integrated LED luminaire 120 comprises one or more LED arrays 214, a power supply unit 310, and an LED luminaire control gear 820. The LED luminaire control gear 820 comprises a current-fed converter circuit 650 configured to provide an emergency power (a voltage and a current) to drive the power supply unit 310 (the external power supply unit 310, hereinafter) and the one or more LED arrays 214 (the external one or more LED arrays 214, hereinafter) when the line voltage from the AC mains is unavailable. The external power supply unit 310 originally designed to receive the line voltage from the AC mains for general lighting applications is configured to operate in the normal mode. The external power supply unit 310 comprises an input operating voltage range such as 100-347 volts (AC or DC). The external power supply unit 310 comprises at least two electrical conductors "L'" and "N'", a main full-wave rectifier 301, and an input filter 302. The at least two electrical conductors "L" and "N" are configured to couple to "L" and "N" in the LED luminaire control gear 820 via a power switch 360. The main full-wave rectifier 301 is configured to convert the line voltage from the AC mains into a primary DC voltage. In other words, the at least two electrical conductors "L" and "N" are coupled to a switched power, in which the external power supply unit 310 can be turned off. The input filter 302 is configured to suppress EMI noises. The power supply unit 310 further comprises a power switching converter 303 comprising a main transformer 304, a power factor correction (PFC) and power switching circuit 305, and a rectifier and filter assembly 307. The PFC and power switching circuit 305 is coupled to the main full-wave rectifier 301 via the input filter 302 and configured to improve a power factor. The power switching converter 303 is configured to convert the primary DC voltage into a main DC voltage. The main DC voltage is configured to couple to the one or more LED arrays 214 to operate thereon. The external power supply unit 310 may further comprise a controller 320 comprising a dimming circuit 306 and a pair of input ports denoted as "D+D−" configured to receive a 0-to-10 V signal, a 1-to-10 V signal, a dimming signal, a PWM signal, or a signal from a variable resistor for luminaire dimming applications. The external power supply unit 310 is a current source, providing an LED driving current to the external one or more LED arrays 214 to operate thereon. In some applications such as a low-power single LED lamp operation, the external power supply unit 310 may not comprise the controller 320.

In FIG. 1, the LED luminaire control gear 820 further comprises the at least two electrical conductors "L" and "N" configured to couple to the AC mains, a rechargeable battery 500, at least one full-wave rectifier 401, at least one input filter 402 coupled to the at least one full-wave rectifier 401, a battery charging circuit 403, and a control and test circuit 701. The at least one full-wave rectifier 401 is coupled to the at least two electrical conductors "L" and "N" and configured to convert the line voltage from the AC mains into a first DC voltage. The at least one input filter 402 is configured to suppress EMI noises. The rechargeable battery 500 comprises a high-potential electrode 501 and a low-potential electrode 502 with a terminal voltage across thereon. The battery charging circuit 403 is an isolated step-down converter and comprises a first ground reference 254, a second ground reference 255 electrically isolated from the first ground reference 254, a first transformer 404, a galvanic isolation circuit 531, a first control device 406, a first electronic switch 407, and a diode 408. The battery charging circuit 403 is coupled to the at least one full-wave rectifier 401 via the input filter 402 and configured to convert the first DC voltage into a second DC voltage that charges the rechargeable battery 500 to reach the terminal voltage. The galvanic isolation circuit 531 is configured to monitor the second DC voltage and to regulate the first control device 406 according to charging voltage and current requirements. The first transformer 404 comprises a primary winding coupled to the first ground reference 254 and a secondary winding coupled to the second ground reference 255. The first transformer 404 is configured to provide electrical isolation between the AC mains and the second DC voltage with respect to the second ground reference 255. In FIG. 1, the second ground reference 255 is electrically coupled to the low-potential electrode 502 that is designated as a third ground reference 256 to ease a charging current to flow into the rechargeable battery 500 and to return to the battery charging circuit 403, completing a power transfer. In FIG. 1, the control and test circuit 701 further comprises a control and test unit 720 and a charging detection and control circuit 740. The control and test circuit 701 is configured to either enable or disable the current-fed converter circuit 650 via a port denoted as "E" according to availability of the AC mains and whether a battery discharging test is initiated. The charging detection and control circuit 740 comprises a first transistor circuit 741 configured to detect a charging voltage (i.e. the second DC voltage) generated from the battery charging circuit 403.

Figure 2:
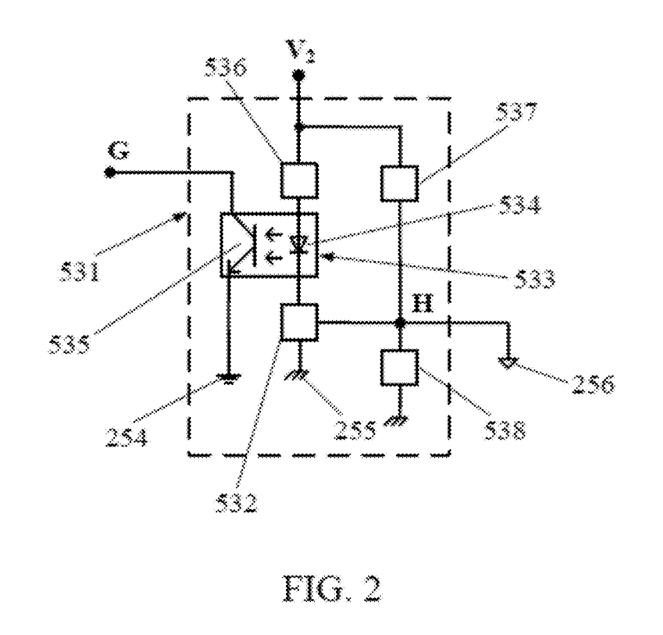
FIG. 2 is a block diagram of a galvanic isolation circuit according to the present disclosure.

FIG. 2 is a block diagram of a galvanic isolation circuit according to the present disclosure. In FIG. 2, the galvanic isolation circuit 531 comprises a shunt regulator 532 and an opto-isolator circuit 533 comprising an LED 534 and a photo-transistor 535 optically coupled to the LED 534. The LED 534 is configured to monitor the second DC voltage ($V_2$) through the shunt regulator 532 whereas the photo-transistor 535 is configured to send a signal to the first control device 406 to turn the first electronic switch 407 on and off, thereby regulating the second DC voltage and the charging current. The galvanic isolation circuit 531 further comprises bias resistors 536 and 537 and a sensing resistor 538. The shunt regulator 532, a three-terminal device, comprises an adjustable reference with the sensing resistor 538 connected to regulate a current flowing into the LED 534, further controlling the photo-transistor 535 whose output port "G" is coupled to the first control device 406 (FIG. 1). The sensing resistor 538 is further configured to couple between the second ground reference 255 and the third ground reference 256, which is coupled to a common ground (i.e. the third ground reference 256) of the current-fed converter circuit 650. In other words, the sensing resistor 538 and the third ground reference 256 provide a common current return path for the third DC voltage from the current-fed converter circuit 650 to deliver power to the external power supply unit and to operate thereon.

Figure 3:
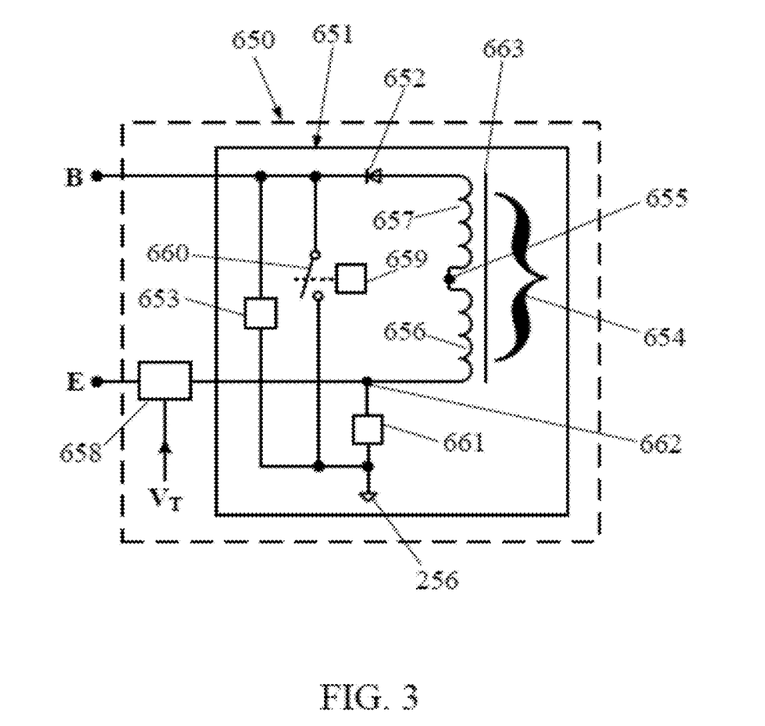
FIG. 3 is a block diagram of a current-fed converter circuit according to the present disclosure.

FIG. 3 is a block diagram of a current-fed converter circuit according to the present disclosure. Referring to FIG. 1 and FIG. 3, the current-fed converter circuit 650 comprises a step-up converter 651 comprising a rectifier 652, a first at least one capacitor 653, and an inductor 654 comprising a tap 655, wherein the tap 655 is configured to divide the inductor 654 into a first sub-inductor 656 and a second sub-inductor 657. The first sub-inductor 656 is configured to couple to the terminal voltage via a third electronic switch 658. The second sub-inductor 657 is configured to magnetically couple to the first sub-inductor 656. The inductor 654 is configured to generate energy pulses that have high voltage potential compatible to a voltage in the input operating voltage range of the external power supply unit 310. The rectifier 652 is coupled to the second sub-inductor 657. The rectifier 652 and the first at least one capacitor 653 are configured to convert the energy pulses into a third DC voltage when the step-up converter 651 is enabled by the third electronic switch 658 coupled to the port "E" coupled to the control and test unit 720. In FIG. 3, the second sub-inductor 657 is configured to magnetically couple to the first sub-inductor 656 in a way that a magnetic flux 663 may be closed. In other words, a toroid ferrite core may be used, taking advantages of low noise and low stray field for low magnetic interference and high efficiency, resulting in high performance. When the battery discharging test is initiated or when the line voltage from the AC mains is unavailable, the control and test unit 720 sends a logic high level signal from the port "E" to turn on the third electronic switch 658, thereby allowing the terminal voltage to apply on the step-up converter 651 to operate thereof. The step-up converter 651 further comprises a logic control device 659, a second electronic switch 660 controlled by the logic control device 659, and a second at least one capacitor 661 coupled between the first sub-inductor 656 and the third ground reference 256. The second at least one capacitor 661 is also coupled to the third electronic switch 658 at a port 662 to receive the terminal voltage ($V_T$) when the third electronic switch 658 is turned on by an enabled signal at the port "E". The current-fed converter circuit 650 is configured to boost the terminal voltage into the third DC voltage at a port "B" with respect to the third ground reference 256, which has same potential as the low-potential electrode 502 of the rechargeable battery 500. The logic control device 659 is configured to control the second electronic switch 660 "on" and "off" to regulate the third DC voltage. The second electronic switch 660 comprises either a metal-oxide-semiconductor field-effect transistor (MOSFET) or a bipolar junction transistor (BJT). The third DC voltage is high enough and in the input operating voltage range of the external power supply unit 310 to ensure operating thereof without failure when the line voltage from the AC mains is unavailable or when the battery discharging test is initiated. In FIG. 1 and FIG. 3, the first at least one capacitor 653 is connected between the rectifier 652 and the third ground reference 256, which is further connected to the low-potential electrode 502 (FIG. 1) to ease a discharging current from the rechargeable battery 500 to flow into the current-fed converter circuit 650 and to return to the rechargeable battery 500, completing a power transfer. In other words, the current-fed converter circuit 650 is configured to receive the terminal voltage from the rechargeable battery 500 and to convert the terminal voltage into the third DC voltage to power up the external power supply unit 310 when the line voltage from the AC mains is unavailable or when the battery discharging test is initiated. The external power supply unit 310 is configured to generate the main DC voltage with a main LED driving current to power up the external one or more LED arrays 214 at full power and to meet LED luminaire efficacy requirements when the line voltage from the AC mains is available. On the other hand, when the battery discharging test is initiated, the control and test circuit 701 may control the external power supply unit 310 by using a low-voltage electric current loop to provide a "dimmed" LED driving current to operate the external one or more LED arrays 214 with a fraction of the full power. The low-voltage electric current loop is necessary to tweak the dimming circuit in the external power supply unit 310 to operate thereof with stability when the "dimmed" LED driving current is used instead to drive the external one or more LED arrays 214. However, if the external power supply unit 310 has a compatible rated power as the current-fed converter circuit 650 does, then the low-voltage electric current loop is not needed. In FIG. 3, to boost up the terminal voltage into the third DC voltage to meet input voltage requirements of operating the external power supply unit 310, the inductor 654 must have a first inductance greater than a second inductance of the first sub-inductor 656. The first inductance and the second inductance comprise an inductance ratio between 10 and 25, depending on the terminal voltage of the rechargeable battery 500 used and the input voltage range of the external power supply unit 310. The current-fed converter circuit 650 further comprises a second at least one capacitor 661 coupled between the third electronic switch 658 and the third ground reference 256. The first at least one capacitor 653 and the second at least one capacitor 661 are configured to filter out unwanted voltage noises generated from the step-up converter 651 and to smooth out output and input voltages, respectively.

In FIG. 1, the control and test circuit 701 further comprises a relay switch 711 and is configured to enable or disable the current-fed converter circuit 650. The relay switch 711 comprises a power sensing coil 712 with a pick-up voltage and a drop-out voltage and is configured to couple either the third DC voltage or the line voltage from the AC mains to the external power supply unit 310 to operate thereon, subsequently powering up the external one or more LED arrays 214 coupled with the external power supply unit 310. The relay switch 711 further comprises a first input electrical terminal 714, a second input electrical terminal 715, and a pair of input electrical terminals 716. The first input electrical terminal 714 is configured to couple to a hot wire "L" of the line voltage from the AC mains whereas the second input electrical terminal 715 is configured to couple to the third DC voltage via the port "B". The pair of input electrical terminals 716 are configured to receive the pick-up voltage to operate the power sensing coil 712. The relay switch 711 further comprises an output electrical terminal 717 configured to relay either the hot wire of the line voltage from the AC mains or the third DC voltage to the external power supply unit 310 to operate thereon. The control and test circuit 701 further comprises a voltage regulator 718 coupled to the power sensing coil 712 whereas the voltage regulator 718 is configured to regulate the pickup voltage applied to the power sensing coil 712. When the current-fed converter circuit 650 is enabled, the pick-up voltage is built up for the power sensing coil 712 to operate. The relay switch 711 further comprises a single-pole double-throw (SPDT) configuration, which accommodates only a current flow to the external power supply unit 310. The current-fed converter circuit 650 further comprises a current return path such as the third ground reference 256. Such a current return path is thus configured for the third DC voltage to deliver power to the external power supply unit 310 and to operate thereon.

Figure 4:
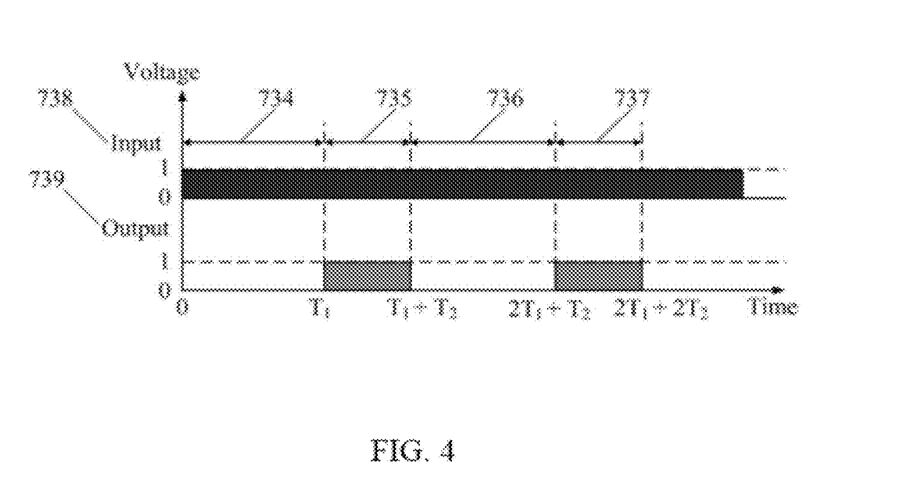
FIG. 4 is a first timing diagram used in the control and test unit 720 according to the present disclosure.

FIG. 4 is a first timing diagram used in the control and test unit 720 according to the present disclosure. The control and test unit 720 comprises one or more timers 721 (FIG. 1) which, in one embodiment, may be implemented in hardware as an electronic circuit. Each of the one or more timers 721 respectively comprises multiple time delays. Each of the one or more timers 721 comprises at least one initial time delay 734 with a duration of $T_1$ and a next time delay 735 with a duration of $T_2$ immediately followed the at least one initial time delay 734. Upon an initiation of each of the one or more timers 721, the at least one initial time delay 734 begins with an input voltage 738 applied. At the end of the at least one initial time delay 734, an output 739 of the control and test unit 720 is activated to reach a logic high level (i.e. "1" state) and remains activated so as to enable the current-fed converter circuit 650 for the next time delay 735. At the end of the next time delay 735, the output 739 of the control and test unit 720 is inactivated to drop to a logic low level (i.e. "0" state). The at least one initial time delay 734 and the next time delay 735 form a primary sequence with a duration of $T_1+T_2$. The primary sequence with the duration of $T_1+T_2$ repeats (736 and 737, for example) until the terminal voltage (FIG. 1) is removed from the self-diagnostic circuit 720. In FIG. 3, the input 738 shown comprises two states "0" and "1", in which "0" means no voltage appeared at the input 738 of the control and test unit 720 whereas "1" means the terminal voltage is applied. Similarly, the output 739 shown comprises two states "0" and "1", in which "0" means no voltage appeared or being inactivated at the output 739 of the control and test unit 720 whereas "1" means that the output 739 of the control and test unit 720 provides an output high-level voltage or is activated. The duration $T_2$ over the next time delay 735 is configured to allow the control and test unit 720 to perform the battery discharging test. In other words, the control and test unit 720 sends the output high-level voltage to enable the current-fed converter circuit 650 via the port "E" during the next time delay 735. The respective at least one initial time delay 734 comprises a nominal duration of 30 days or 365 days whereas the respective next time delay 735 comprises a nominal duration of 30 seconds or 90 minutes.

Figure 5:
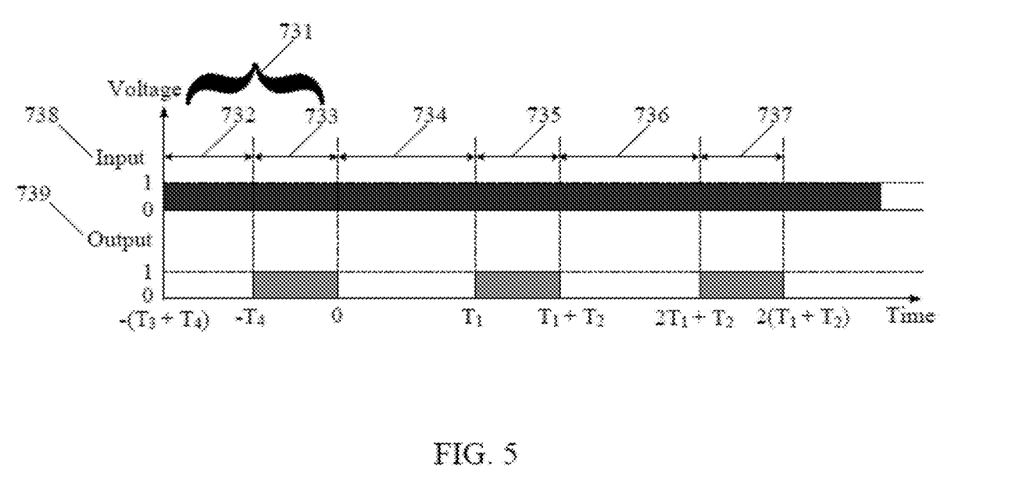
FIG. 5 is a second timing diagram used in the control and test unit 720 according to the present disclosure.

FIG. 5 is a second timing diagram of the control and test unit 720 according to the present disclosure. The multiple time delays further comprise a preliminary sequence 731 prior to the at least one initial time delay 734. The preliminary sequence 731 comprises a first time delay 732 and a second time delay 733. Upon an initiation of each of the one or more timers 721, the first time delay 732 begins with an input voltage 738 applied. At an end of the first time delay 732, the output 739 of the control and test unit 720 is activated to reach a logic high level and remains activated so as to enable the current-fed converter circuit 650 for the second time delay 733. At an end of the second time delay 733, the output 739 of the control and test unit 720 is inactivated to drop to a logic low level. A duration $T_3$ over the first time delay 732 is configured to allow the rechargeable battery 500 to be fully charged whereas a duration $T_4$ over the second time delay 733 is configured to allow the control and test unit 720 to perform the battery discharging test. In other words, the control and test unit 720 sends the output high-level voltage to enable the current-fed converter circuit 650 via the port "E" during the second time delay 733. The preliminary sequence 731 is configured to prepare an initiation process. The preliminary sequence 731 may be further configured to manage a reset process when the primary sequence fails to complete accidentally or due to a power outage. The second time delay 733 comprises a nominal duration $T_4$ of 90 minutes or 30 seconds.

Figure 6:
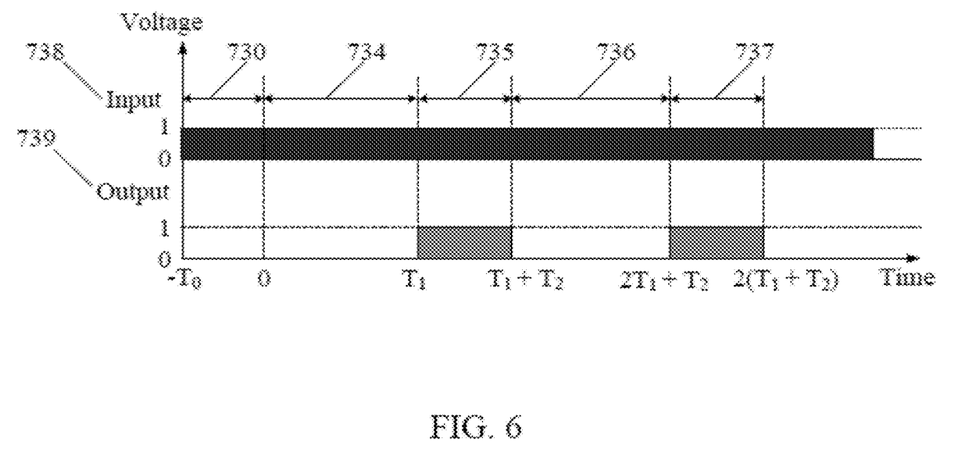
FIG. 6 is a third timing diagram used in the control and test unit 720 according to the present disclosure.

FIG. 6 is a third timing diagram used in the control and test unit 720 according to the present disclosure. The multiple time delays further comprise a preliminary time delay 730 prior to the at least one initial time delay 734. Upon an initiation of each of the one or more timers 721, the preliminary time delay 730 begins with an input voltage 738 applied. At an end of the preliminary time delay 730, the primary sequence with the duration of $T_1+T_2$ continues (over a duration of 734 and 735) and repeats (over a duration of 736 and 737) until the third DC voltage (FIG. 1) is removed from the control and test unit 720. A duration $T_0$ over the preliminary time delay 730 is configured to allow the rechargeable battery to be fully charged. The duration T₀ over the preliminary time delay 730 may comprise a duration of 24 hours or 48 hours.

In FIG. 1, the charging detection and control circuit 740 further comprises a first peripheral circuit 744. The first peripheral circuit 744 is configured to sample a fraction of the terminal voltage on the rechargeable battery 500 and to deliver to the control and test unit 720 to examine over the duration of the next time delay 735 or the duration of the second time delay 733 when the battery discharging test is initiated. The control and test unit 720 examines the terminal voltage on the rechargeable battery 500 in reference to a nominal voltage in a range from 85% to 87.5% of either a rated terminal voltage of the rechargeable battery 500 or the terminal voltage before testing. The charging detection and control circuit 740 further comprises a linear voltage regulator 746 configured to regulate the terminal voltage to an operating voltage of the control and test unit 720 to operate thereof. The charging detection and control circuit 740 further comprises at least one status indicator 747 controlled by the control and test unit 720 and configured to show results of the battery discharging test.

The control and test unit 720 is further configured to receive a pull-up signal from the first transistor circuit 741 and to send a first control signal to the first control device 406 to inactivate the battery charging circuit 403 when the battery discharging test is initiated. The charging detection and control circuit 740 is coupled between the battery charging circuit 403 and the rechargeable battery 500 and controlled by the control and test unit 720. When the first transistor circuit 741 detects the charging voltage, a pull-down signal is sent to the control and test unit 720 to enable a normal charging process. The charging detection and control circuit 740 further comprises a charging control circuit 750 comprising a second transistor circuit 742 and at least one MOSFET circuit 743. The charging control circuit 750 is configured to allow a charging current to flow into the rechargeable battery 500 when the line voltage from the AC mains is available whereas the charging control circuit 750 prohibits the charging current to flow into the rechargeable battery 500 when the battery discharging test is initiated. The second transistor circuit 742 is configured to receive a high-level signal approximately equal to an operating voltage of the control and test unit 720 therefrom to pull down a bias voltage of the at least one MOSFET circuit 743, thereby disconnecting the charging current when the battery discharging test is initiated.

The charging detection and control circuit 740 further comprises at least one pair of electrical contacts 748 configured to electrically couple the rechargeable battery 500 to the battery charging circuit 403, the current-fed converter circuit 650, and the control and test unit 720 when the at least one pair of electrical contacts 748 are connected. When the battery discharging test is initiated or when the line voltage from the AC mains is unavailable, power from the rechargeable battery 500 can operate the current-fed converter circuit 650 and the control and test unit 720. On the other hand, when disconnected, the at least one pair of electrical contacts 748 can safely prevent the rechargeable battery 500 from being drained. The at least one pair of electrical contacts 748 comprise electrical contacts in a switch, a relay, and a jumper, or electrical terminals accommodated for jumper wires. The charging detection and control circuit 740 further comprises a user interface 749 coupled to the control and test unit 720 and is configured to manually have the control and test unit 720 initiate the battery discharging test. The user interface 749 may be further configured to manually have the control and test unit 720 terminate the battery discharging test that is in progress. In other words, the LED luminaire control gear 820 comprises a manual test comprising a 30-second test and a 90-minute test and an auto-test comprising the same test as the manual test. In FIG. 1, the control and test circuit 701 may further comprise a low-voltage conversion circuit 771 configured to regulate the external power supply unit to operate with a fraction of power consumed when the line voltage from the AC mains is available. The low-voltage conversion circuit 771 is configured to auto-adjust the dimming signal in the external power supply unit 310 from a voltage level of 10 volts to a nominal voltage of 1 volt. The process ensures that output power equals input power so as to maintain stability of the external power supply unit 310 in a way that the external one or more LED arrays 214 are operated with the fraction of power without strobing. The low-voltage conversion circuit 771 comprises a fourth electronic switch 772 configured to pull down the dimming signal in the external power supply unit 310.

The control and test unit 720 may comprise a microcontroller, a microchip, or a programmable logic controller. In this disclosure, the LED luminaire control gear 820 may be coupled to the integrated LED luminaire 120 with the control and test unit 720 to auto-test charging and discharging current of a rechargeable battery 500 with test results displayed in a status indicator, supporting dual mode operations of the integrated LED luminaire 120 to work in a normal mode and in an emergency mode.

Whereas preferred embodiments of the present disclosure have been shown and described, it will be realized that alterations, modifications, and improvements may be made thereto without departing from the scope of the following claims. Another kind of schemes with an LED luminaire control gear and multiple timers and multiple time delays adopted to operate an LED luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire control gear, comprising:
   a rechargeable battery comprising a high-potential electrode and a low-potential electrode with a terminal voltage across thereon;
   at least one full-wave rectifier configured to be coupled to alternate-current (AC) mains to convert a line voltage from the AC mains into a first direct-current (DC) voltage;
   a battery charging circuit comprising a first transformer, a first control device, a first electronic switch, a first ground reference, a second ground reference electrically isolated from the first ground reference, and a galvanic isolation circuit coupled to both the first ground reference and the second ground reference, wherein the battery charging circuit is configured to be coupled to the at least one full-wave rectifier to convert the first DC voltage into a second DC voltage that charges the rechargeable battery to reach the terminal voltage, and wherein the galvanic isolation circuit is configured to couple the second DC voltage to the first control device in response to various charging voltage and current requirements;
   a current-fed converter circuit comprising a rectifier, at least one capacitor, and an inductor comprising a tap, wherein the tap is configured to divide the inductor into a first sub-inductor and a second sub-inductor, wherein the first sub-inductor is configured to couple to the terminal voltage, wherein the second sub-inductor is configured to magnetically couple to the first sub-inductor, wherein the inductor is configured to generate energy pulses that have a first voltage potential compatible to a first voltage in an input operating voltage range of an external power supply unit, wherein the rectifier is coupled to the second sub-inductor, and wherein the rectifier and the at least one capacitor are configured to convert the energy pulses into a third DC voltage when the current-fed converter circuit is enabled; and a control and test circuit comprising a relay switch, wherein the control and test circuit is configured to enable or disable the current-fed converter circuit, and wherein the relay switch comprises a power sensing coil with a pick-up voltage and is configured to couple either the third DC voltage or the line voltage from the AC mains to the external power supply unit to operate thereon, subsequently powering up external one or more LED arrays coupled with the external power supply unit, wherein:

the relay switch further comprises a first input electrical terminal, a second input electrical terminal, and a pair of input electrical terminals, wherein the first input electrical terminal is configured to couple to a hot wire of the line voltage from the AC mains, wherein the second input electrical terminal is configured to couple to a high-potential lead wire of the third DC voltage, and wherein the pair of input electrical terminals are configured to receive the pick-up voltage to operate the power sensing coil; and the relay switch further comprises an output electrical terminal configured to relay either the hot wire of the line voltage from the AC mains or the high-potential lead wire of the third DC voltage to the external power supply unit to operate thereon.

2. The LED luminaire control gear of claim 1, wherein the control and test circuit further comprises a low-voltage conversion circuit configured to couple to a dimming circuit in the external power supply unit and to regulate the external power supply unit to operate with a fraction of full power consumed when the line voltage from the AC mains is available, and wherein the low-voltage conversion circuit is further configured to auto-adjust a dimming signal in the dimming circuit and to maintain stability of the external power supply unit in a way that the external one or more LED arrays are operated with the fraction of the full power without strobing.

3. The LED luminaire control gear of claim 2, wherein the low-voltage conversion circuit comprises an electronic switch configured to pull down the dimming signal in the external power supply unit, thereby operating the external power supply unit with the fraction of the full power.

4. The LED luminaire control gear of claim 1, wherein the relay switch further comprises a single-pole double-throw (SPDT) configuration, and wherein the current-fed converter circuit further comprises a third ground reference configured to provide a current return path for the third DC voltage to deliver power to the external power supply unit and to operate thereon.

5. The LED luminaire control gear of claim 1, wherein the control and test circuit further comprises a user interface and a control and test unit, and wherein the control and test unit is configured to probe the second DC voltage, to receive input signals from the user interface, to control charging and discharging of the rechargeable battery, and to perform a battery discharging test.

6. The LED luminaire control gear of claim 5, wherein the control and test unit is further configured to receive a pull-down signal from the user interface and to send a first control signal to the first control device to inactivate the battery charging circuit when the battery discharging test is initiated by the user interface.

7. The LED luminaire control gear of claim 5, wherein the control and test circuit further comprises a charging detection and control circuit, wherein the charging detection and control circuit comprises a first transistor circuit configured to detect the second DC voltage, wherein the charging detection and control circuit is coupled between the battery charging circuit and the rechargeable battery and controlled by the control and test unit, and wherein, when the first transistor circuit detects the second DC voltage, the control and test unit receives a pull-down signal to enable a normal charging process, thereby allowing a charging current to flow into the rechargeable battery.

8. The LED luminaire of claim 7, wherein the charging detection and control circuit further comprises a charging control circuit comprising a second transistor circuit and at least one metal-oxide-semiconductor field-effect transistor (MOSFET) circuit, and wherein the charging control circuit is configured to prohibit the charging current to flow into the rechargeable battery when the battery discharging test is initiated.

9. The LED luminaire of claim 8, wherein the second transistor circuit is configured to receive a high-level signal equal to a nominal operating voltage of the control and test unit therefrom to pull down a bias voltage of the at least one MOSFET circuit, thereby disconnecting the charging current when the battery discharging test is initiated.

10. The LED luminaire control gear of claim 1, wherein the control and test circuit further comprises a voltage regulator coupled to the power sensing coil, wherein the voltage regulator is configured to regulate the pick-up voltage applied to the power sensing coil, and wherein, when the current-fed converter circuit is enabled, the pick-up voltage is built up for the power sensing coil to operate.

11. The LED luminaire control gear of claim 7, wherein the galvanic isolation circuit comprises a shunt regulator and an opto-isolator circuit comprising an LED and a photo-transistor optically coupled to the LED, wherein the LED is configured to monitor the second DC voltage through the shunt regulator, and wherein the photo-transistor is configured to send a signal to the first control device to turn the first electronic switch on and off, thereby regulating the second DC voltage and the charging current.

12. The LED luminaire control gear of claim 11, wherein the galvanic isolation circuit further comprises a sensing resistor coupled to the second ground reference and a third ground reference coupled to the low-potential electrode, wherein the sensing resistor is configured to adjust a reference voltage to the shunt regulator, and wherein the sensing resistor and the third ground reference are configured to provide a common current return path for the third DC voltage to deliver power to the external power supply unit and to operate thereon.

13. The LED luminaire control gear of claim 5, wherein the control and test unit comprises one or more timers, wherein each of the one or more timers respectively comprises multiple time delays, wherein the multiple time delays of each of the one or more timers respectively comprise at least one initial time delay and a next time delay immediately following the at least one initial time delay, wherein, upon an initiation of each of the one or more timers, the at least one initial time delay begins with the terminal voltage applied, wherein, at an end of the at least one initial time delay, an output of the control and test unit is activated to reach a logic high level and remains activated so as to enable the current-fed converter circuit for the next time delay, wherein, at an end of the next time delay, the output of the control and test unit is inactivated to drop to a logic low level, wherein the at least one initial time delay and the next time delay form a primary sequence that repeats, and wherein a duration over the next time delay is configured to allow the control and test unit to perform the battery discharging test.

14. The LED luminaire control gear of claim 13, wherein the next time delay comprises a nominal duration of 90 minutes or 30 seconds.

15. The LED luminaire control gear of claim 13, wherein the at least one initial time delay comprises a nominal duration of 30 days or 365 days.

16. The LED luminaire control gear of claim 13, wherein the charging detection and control circuit further comprises a first peripheral circuit configured to sample a fraction of the terminal voltage on the rechargeable battery and to deliver to the control and test unit to examine over a duration of the next time delay when the battery discharging test is initiated.

17. The LED luminaire control gear of claim 16, wherein the control and test unit is configured to examine the terminal voltage on the rechargeable battery in reference to a nominal voltage in a range from 85% to 87.5% of a rated terminal voltage of the rechargeable battery.

18. The LED luminaire control gear of claim 7, wherein the charging detection and control circuit further comprises at least one status indicator coupled to the control and test unit, the at least one status indicator configured to show a result of the battery discharging test.

19. The LED luminaire control gear of claim 7, wherein the charging detection and control circuit further comprises at least one pair of electrical contacts configured to electrically couple the rechargeable battery to the battery charging circuit and the control and test unit, wherein, when the at least one pair of electrical contacts are connected, power from the rechargeable battery operates the control and test unit when the battery discharging test is initiated or when the line voltage from the AC mains is unavailable, and wherein, when disconnected, the at least one pair of electrical contacts prevent the rechargeable battery from being drained.

20. The LED luminaire control gear of claim 19, wherein the at least one pair of electrical contacts comprise electrical contacts in a switch, a relay, and a jumper, or electrical terminals accommodated for jumper wires.

21. The LED luminaire control gear of claim 5, wherein the user interface comprises a push-button switch configured to provide the input signals to the control and test unit.

22. The LED luminaire control gear of claim 21, wherein the input signals comprise various designated codes configured causing the control and test unit to execute charging and discharging of the rechargeable battery and the battery discharging test.

23. The LED luminaire control gear of claim 22, wherein the user interface is further configured to manually stop the control and test unit from performing the battery discharging test, thereby terminating the third DC voltage appeared at the high-potential lead wire to prevent users from electric shock.

24. The LED luminaire control gear of claim 1, wherein the current-fed converter circuit further comprises a second control device and a second electronic switch, and wherein the second control device is configured to turn the second electronic switch on and off, thereby generating the energy pulses from the inductor and regulating the third DC voltage at the at least one capacitor.

25. The LED luminaire control gear of claim 1, wherein the inductor has a first inductance, wherein the first sub-inductor has a second inductance smaller than the first inductance, and wherein the first inductance and the second inductance form an inductance ratio between 10 and 25, depending on both the terminal voltage and the input operating voltage range of the external power supply unit.

26. The LED luminaire control gear of claim 5, wherein the user interface comprises a remote control comprising a push-button switch.

27. The LED luminaire control gear of claim 1, wherein the current-fed converter circuit further comprises a step-up converter and a third electronic switch, and wherein the third electronic switch is configured to control the terminal voltage to apply to the step-up converter and to enable thereof.

28. The LED luminaire control gear of claim 5, wherein the control and test unit comprises a microcontroller, a microchip, or a programmable logic controller.

* * * * *